Feb. 24, 1948.   F. G. TRITT ET AL   2,436,461
CRASH PAD FOR WAR TANKS OR OTHER VEHICLES
Filed May 14, 1942   2 Sheets-Sheet 1
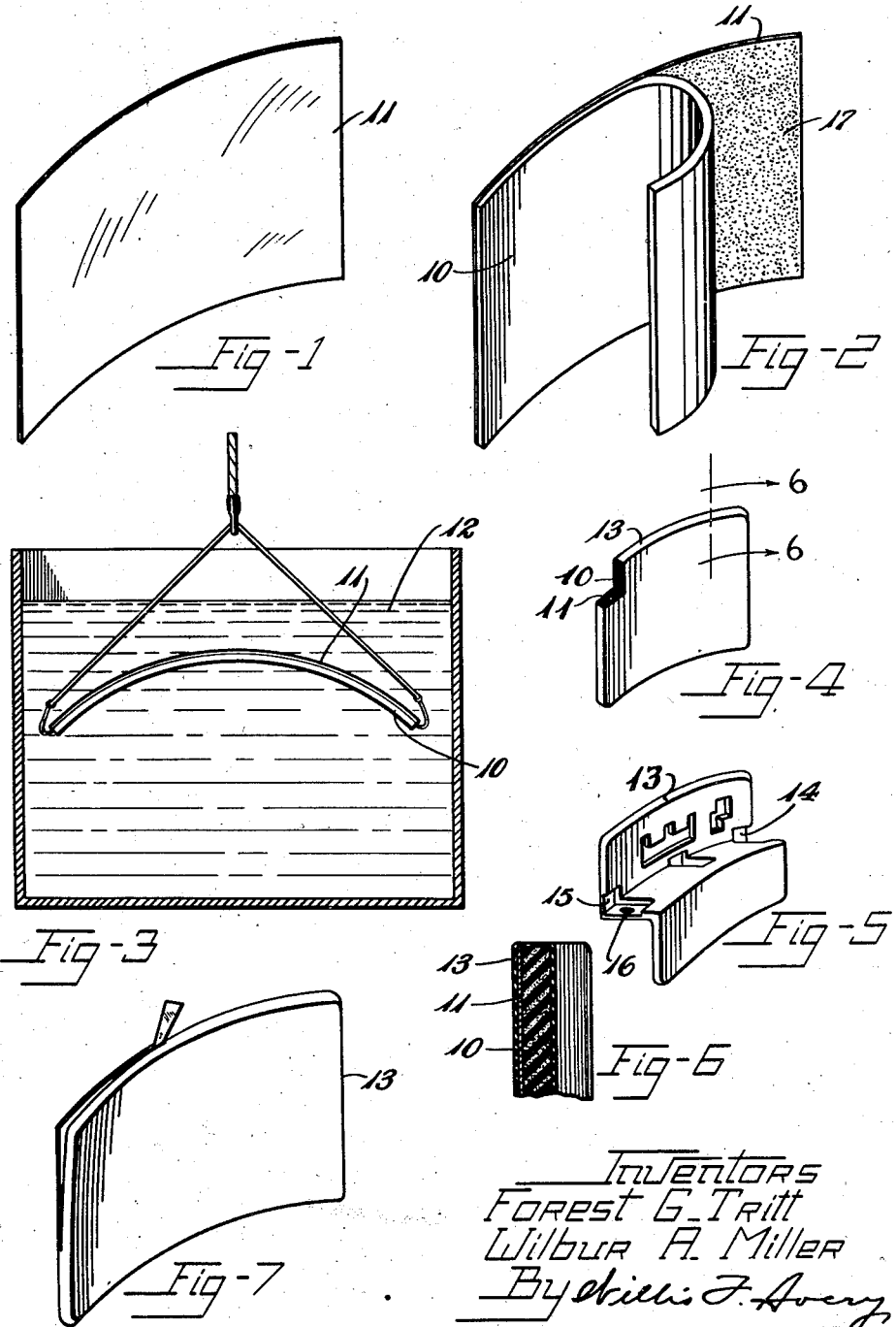

Feb. 24, 1948.  F. G. TRITT ET AL  2,436,461
CRASH PAD FOR WAR TANKS OR OTHER VEHICLES
Filed May 14, 1942  2 Sheets-Sheet 2

Inventors
Forest G. Tritt
Wilbur A. Miller
By Willis F. Avery
Atty.

Patented Feb. 24, 1948

2,436,461

UNITED STATES PATENT OFFICE 2,436,461

CRASH PAD FOR WAR TANKS OR OTHER VEHICLES

Forest G. Tritt, Sherman, and Wilbur A. Miller, Akron, Ohio, assignors to The B. F. Goodrich Company, New York, N. Y., a corporation of New York Application May 14, 1942, Serial No. 442,950

10 Claims. (Cl. 154—43)

This invention relates to a method of making crash pads for war tanks or other vehicles in order to provide protection to the occupants thereof, and to the crash pads that are made thereby.

It is the object of this invention to provide a method of making improved crash pads for use on the interior surfaces of modern war tanks in order to provide protection against violent contact with these surfaces by the occupants of the war tank.

In making crash pads for war tanks we provide a sheet-like element of rubbery sponge of a substantial thickness and of a size to cover the designated interior sections of the war tanks with which the occupants of the tanks are most likely to contact while the tank is in motion. Substantially the entire exposed surface of this sponge is then covered with a relatively thin and impervious layer of rubbery material in adhering relationship with the sponge and the covered sponge is secured to the desired interior section of the tank. One of the methods of practicing this invention is to provide a thin relatively stiff backing member having approximately the same size and configuration as the localized section of the interior of the tank to be covered by the crash pad, and a layer of rubbery sponge of approximately the same size as the backing member. The rubbery sponge is secured to the backing member and the assembly is covered by an adhering envelope of an impervious layer of rubbery material. To complete the operation the backing member is then secured to the designated section of the interior of the war tank.

This invention can best be understood by reference to the accompanying drawings, of which Fig. 1 is a perspective view of a backing member for supporting the rubbery sponge;

Fig. 2 is a perspective view showing the rubbery sponge being adhered to the backing member;

Fig. 3 is an elevation showing a preferred method of covering the rubbery sponge with a thin and impervious adhering layer of rubbery material;

Fig. 4 is a perspective view, partially broken away for clarity of illustration, showing the backing member and rubbery sponge covered with the impervious layer of rubbery material;

Fig. 5 is a perspective view of a crash pad for a turret of a war tank;

Fig. 6 is a cross-sectional view taken along line 6—6 of Fig. 4;

Fig. 7 is a perspective view of one step in a modified method of making a crash pad;

Figure 8:
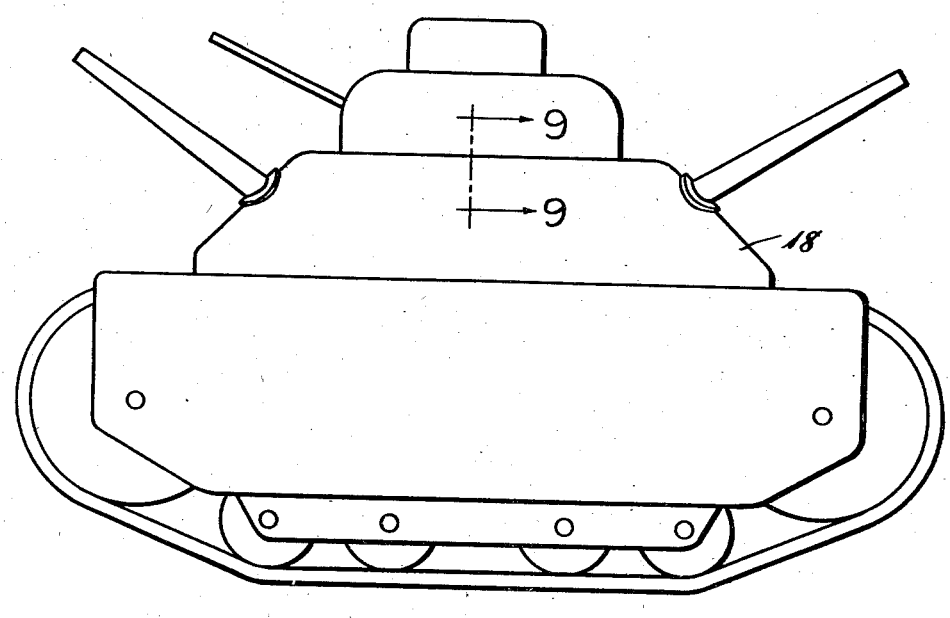
Fig. 8 is an elevation of a war tank embodying a crash pad made in accordance with the present invention.
Figure 9:
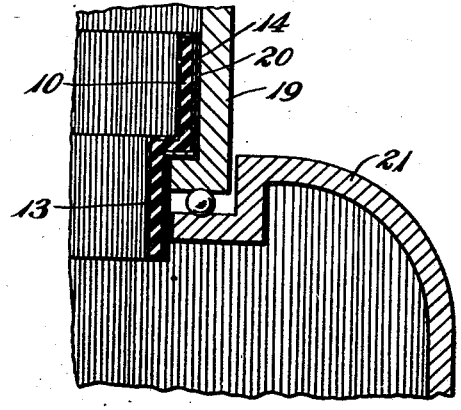
Fig. 9 is a cross-sectional view taken along line 9—9 of Fig. 8.

In one modification of our invention, a sheet-like element of rubbery sponge 10 approximately one inch thick is secured to a relatively rigid backing member 11 having the same size and configuration as the localized section of the interior of the war tank 18 to be covered by the crash pad. This assembly is immersed (Fig. 3) in an aqueous dispersion of rubbery material 12 to give it an overall adherent coating of impervious rubbery material 13, the rubbery material is vulcanized, if necessary, and the structure is then secured to the designated interior section of the tank (Fig. 9). If desired the rubbery sponge may be removed from the backing member (Fig. 7) after the thin coating of rubbery material 13 has been applied and the coated sponge itself, without the backing member, secured to an interior surface of the tank. This latter procedure is somewhat less satisfactory, however, because the crash pad sometimes tends to pull loose from the tank wall when severe service conditions are encountered.

To overcome such tendency to pull loose and to facilitate attachment if the crash pad is to be used on corners in the interior of the war tank, or other areas where fastening to the tank might be difficult, it has been found highly desirable to use a metal backing member 14 having the same size and configuration as the section of the tank to be covered by the crash pad. Here the rubbery sponge is secured permanently to the backing member by using any suitable adhesive and the backing member with the adhered rubber sponge is dipped in or otherwise coated with an aqueous dispersion of rubber material 12 to provide an overall and closely adhering envelope of rubbery material. The metal backing member 14 is then secured to the interior section of the tank by any appropriate securing means. In this case it is quite often desirable to have the layer of rubbery sponge 10 somewhat smaller than the metal backing member 14, as shown in Fig. 5, so that small areas 15 of the backing member will be left exposed. At these small areas the rubbery envelope is removed so that the backing member may be bolted, or spot welded to the tank through holes 16 provided in the metal backing member. A typical construction embodying a metal backing member is shown in Fig. 9 wherein the tank turret 18 is provided with a crash pad 20 extending down into the main body portion 21 of the tank 18.

In the event that the rubbery sponge is to be removed from the backing member after receiving its coating of rubbery material it has been found necessary that a temporary adhesive 17 be used for sticking the sponge to the backing member. An uncompounded rubber cement consisting of rubber dissolved in a solvent such as gasoline has been found highly successful for this purpose. When the rubbery sponge is to be secured permanently to the backing member, or where the sponge is secured directly to the tank, any desired adhesive composition may be used that will provide a permanent bond. A thermoprene cement is quite satisfactory for this purpose.

It has been found highly desirable in this invention that reinforcing strips of fabric coated with an adhesive be applied to the edges of the rubbery sponge before the sponge is coated with its overall layer of impervious rubbery material. When this reinforcing fabric is used it is arranged so it contacts either the backing member or, when no backing member is used, the metal wall of the tank's interior. While the use of such fabric reinforcing strips are desirable they are not absolutely required.

It has been discovered in investigating the problem of providing crash pads for tanks that merely adhering pads of plain rubbery sponge to tank surfaces will not be successful. Modern war tanks take considerable punishment as they travel at high speeds over all kinds of terrain and over and through all sorts of obstacles. Due to these extremely severe service conditions, the shaking and vibration set up in the tank, and the shock of objects within the tank striking any ordinary crash pad produce a difficult problem in providing crash pads that will survive the shock and strain. We have found that the crash pads made according to the method of this invention have the ability to survive the roughest of treatment and still provide superior protection for the occupants of the war tanks. This superior life appears to be due primarily to the adherent rubbery envelope surrounding the rubbery sponge and the backing member, where one is used, as it serves to make a unitary product of the whole assembly.

For this invention the rubbery material used to make the cellular sponge and the impervious covering may be any elastic material having the essential properties of rubber to make it long-lasting, resilient, and, of course, elastic. These include natural and synthetic rubber in all its forms, plasticized polyvinyl chloride, and the rubbery resins, both natural and synthetic. Among the best of these, besides natural rubber, are plasticized polyvinyl halides such as polyvinyl chloride. This latter material may be made up into an excellent sponge and it possesses the highly desirable quality of being fire resistant.

The thin impervious coating or envelope of rubbery material specified herein may be applied in any desired manner such as by brushing on a liquid, spraying, or by immersion in an aqueous dispersion of the rubbery material. It is often of advantage to apply a cement to the surface of the backing member and rubbery sponge before the thin impervious coating is applied. This helps in obtaining a closely adhering envelope. As an example of this, when natural rubber latex is used to supply the thin coating, an uncompounded rubber cement made by dissolving rubber in a solvent such as gasoline may be applied before immersion in the latex. Coagulants may also be used to assist in depositing rubber from the latex and, in general, any of those coagulants mentioned in the Willson Patent, No. 1,996,090, may be used to advantage.

It is to be understood that although we have described our invention in considerable detail together with preferred methods of practicing it, many variations may be brought about in details of the procedures, structures and materials hereinabove set out without departing from the spirit and scope of the invention as defined by the appended claims.

We claim:

1. A crash pad structure for a war tank or other vehicle, comprising a thin relatively stiff backing member adapted to be secured to a localized section of the vehicle structure, a sheet-like element of rubbery sponge of a substantial thickness and of approximately the same size as the backing member and secured to the backing member, and a thin relatively impervious envelope of rubbery material adhered to substantially the entire surface of the assembly of backing member and rubbery sponge element.

2. A crash pad structure for a war tank or other vehicle, comprising a thin metal backing member of substantially the same size and configuration as a localized section of the vehicle structure and adapted to be secured to said localized section, a sheet-like element of rubbery sponge of an appreciable thickness slightly smaller in size than the area of the backing member and secured to the backing member, a relatively thin and impervious envelope of rubbery material adhered to substantially the entire surface of the assembly of backing member and rubbery sponge element, and securing means located at the areas of the backing member left uncovered by the rubbery sponge element for securing the backing member to the localized section of the vehicle structure.

3. A crash pad for a war tank or other vehicle, comprising a thin relatively stiff backing member adapted to be secured to a localized section of the vehicle structure, a sheet like element of sponge rubber of substantial thickness and of approximately the same size as the backing member and secured to the backing member, and a thin relatively impervious envelope of rubber adhered to substantially the entire surface of the assembly of backing member and sponge element.

4. A crash pad structure for a war tank or other vehicle, comprising a thin metal backing member of substantially the same size and configuration as a localized section of the vehicle structure and adapted to be secured to said localized section, a sheet-like element of sponge rubber of an appreciable thickness slightly smaller in size than the area of the backing member and secured to the backing member, a relatively thin and impervious envelope of rubber adhered to substantially the entire surface of the assembly of backing member and sponge rubber element, and securing means located at the areas of the backing member left uncovered by the sponge rubber element for securing the backing member to the localized section of the vehicle structure.

5. A crash pad for a war tank or other vehicle, comprising a thin relatively stiff backing member adapted to be secured to a localized section of the vehicle structure, a sheet-like element of plasticized polyvinyl halide sponge of substantial thickness and of approximately the same size as the backing member and secured to the backing member, and a thin relatively impervious envelope of plasticized polyvinyl halide adhered to substantially the entire surface of the assembly of backing member and sponge element.

6. A crash pad structure for a war tank or other vehicle, comprising a thin metal backing member of substantially the same size and configuration as a localized section of the vehicle structure and adapted to be secured to said localized section, a sheet-like element of plasticized polyvinyl halide sponge of an appreciable thickness slightly smaller in size than the area of the backing member and secured to the backing member, a relatively thin and impervious envelope of plasticized polyvinyl halide adhered to substantially the entire surface of the assembly of backing member and sponge rubber element, and securing means located at the areas of the backing member left uncovered by the sponge rubber element for securing the backing member to the localized section of the vehicle structure.

7. A cushioning pad for a zone of complicated contours as in the turret of a war tank, said pad comprising a sheet metal base formed to provide a plurality of angularly intersecting surfaces of substantial extent conforming generally to said contours, resilient rubbery cushioning material secured to one face of said base and extending over a plurality of said surfaces, and a substantially impervious skin coating of rubbery material adhered to said cushioning material and substantially enveloping the composite structure formed by the base and the cushioning material.

8. A cushioning pad for a zone of complicated contours, said pad comprising a sheet metal base formed to provide a plurality of angularly intersecting surfaces of substantial extent conforming generally to said contours, one of said surfaces having means for attaching the base to another structure while another of said surfaces is devoid of such means, resilient rubbery cushioning material secured to one face of said base and substantially covering both said surfaces except for localized zones adjacent said means for attaching the base to another structure, and a thin skin coating of substantially impervious rubbery material adhered to the cushioning material and substantially covering the exposed face thereof.

9. A cushioning pad comprising a sheet metal base formed to provide a plurality of angularly intersecting surfaces of substantial extent, a layer of resilient rubbery cushioning material of spongy structure extending continuously over a plurality of said surfaces on one face of the base, and a thin skin coating of substantially impervious rubbery material substantially enveloping the entire composite structure formed by the base and the cushioning material and substantially covering the other face of the said base and the exposed face of the cushioning material.

10. A cushioning pad comprising a base member of sheet metal having substantial rigidity, a layer of resilient rubbery cushioning material of spongy structure secured to one face of the base member and covering at least the major part of said face, and a thin skin coating of substantially impervious rubbery material continuously covering the exposed face of the said cushioning material and also extending continuously over the edges and at least a part of the reverse face of said base.

FOREST G. TRITT.
WILBUR A. MILLER.

REFERENCES CITED

The following references are of record in the file of this patent:

UNITED STATES PATENTS

| Number | Name | Date |
|---|---|---|
| 1,388,600 | Posson | Aug. 23, 1921 |
| 1,766,471 | Van Dusen | June 24, 1930 |
| 2,023,268 | Dodge | Dec. 3, 1935 |
| 2,116,915 | Tellkamp | May 10, 1938 |
| 2,356,426 | Portnow | Aug. 22, 1944 |

FOREIGN PATENTS

| Number | Country | Date |
|---|---|---|
| 698,999 | Germany | Nov. 21, 1940 |